Jan. 16, 1934.  A. T. POTTER  1,943,550
SEAT CONTROL MECHANISM
Filed Oct. 17, 1932
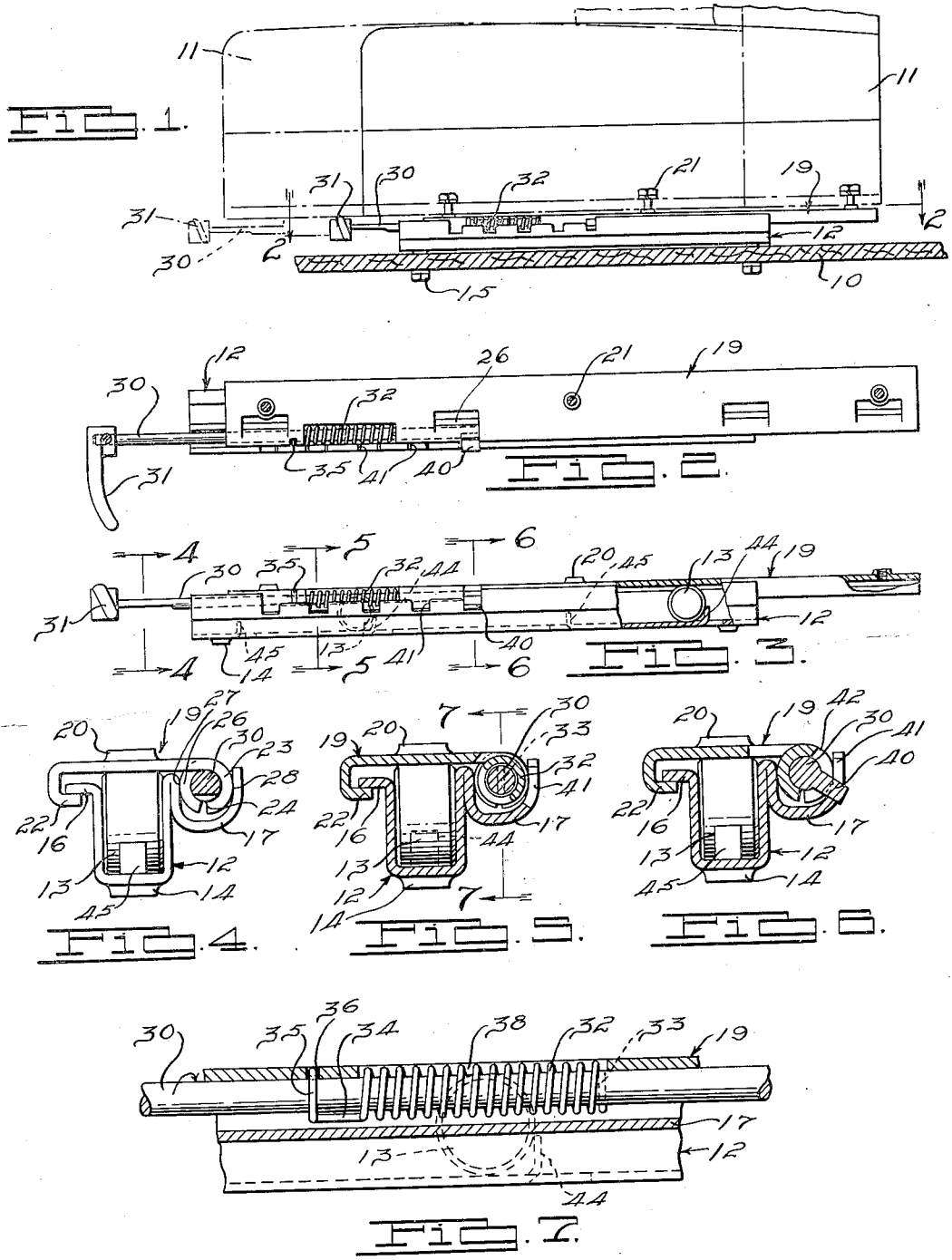
INVENTOR
Albert T. Potter.
BY
Harness, Dickey, Pierce & Hanna
ATTORNEYS.

Patented Jan. 16, 1934

1,943,550

UNITED STATES PATENT OFFICE 1,943,550

SEAT CONTROL MECHANISM

Albert T. Potter, Detroit, Mich., assignor to Ainsworth Manufacturing Corporation, a corporation of Michigan Application October 17, 1932. Serial No. 638,149

14 Claims. (Cl. 155—14)

The invention relates to motor vehicles or the like, and it has particular relation to a mechanism for controlling the position of one of the seats therein and particularly the seat provided for the driver of the vehicle.

One object of the invention is to provide a seat control mechanism which may be manufactured as an article of manufacture, ready to be installed with little difficulty in motor vehicles produced by motor vehicle manufacturers.

Another object of the invention is to provide a seat control mechanism of improved character, which may be manufactured inexpensively and manipulated with ease for adjusting the position of the seat.

Another object of the invention is to provide a seat control mechanism which may be largely manufactured from sheet metal and thus produced very economically.

Other objects of the invention will become apparent from the following description relating to a particular embodiment of the invention, and the claims hereinafter set forth.

For a better understanding of the invention, reference may be had to the accompanying drawing forming a part of the specification wherein:

Fig. 1 is a fragmentary, longitudinal cross-sectional view of a motor vehicle body illustrating a seat control mechanism constructed according to one form of the invention;

Fig. 2 is a cross-sectional view on a slightly larger scale, taken substantially along the line 2—2 of Fig. 1;

Fig. 3 is a side elevational view of the arrangement shown by Fig. 2;

Fig. 4 is a cross-sectional view on a larger scale, taken substantially along the line 4—4 of Fig. 3;

Fig. 5 is a cross-sectional view on a larger scale taken substantially along the line 5—5 of Fig. 3;

Fig. 6 is a cross-sectional view on a larger scale taken substantially along the line 6—6 of Fig. 3;

Fig. 7 is a cross-sectional view taken substantially along the line 7—7 of Fig. 5.

Referring to Fig. 1, the floor of a motor vehicle is indicated at 10 and an adjustable driver's seat supported on the floor, is indicated at 11. As best shown by Figs. 4, 5 and 6, a seat control mechanism is provided which comprises an elongated channel plate member 12 having a plurality of rollers 13 therein so as to slightly project above the legs of the channel. The base of the member 12 may be provided with a plurality of bosses 14 and such bosses may have threaded openings for the purpose of securing the channel member to the floor 10 by means of bolts 15, as shown clearly by Fig. 1. The bosses may be pressed from the base part of the channel member, or otherwise formed, and the channel member may be formed by working sheet metal into the desired shape.

One leg of the channel member terminates in a lateral projection 16, while the other is reversely bent and formed into a channel portion 17 extending parallel to, and along the side of the member. The channel member and rollers are adapted to cooperate with an elongated plate member 19 supported on the rollers, and such plate member has bosses 20 similar to the bosses 14, by means of which the member may be secured to the seat 11, by bolts 21. One edge portion of the plate member 19 is shaped to provide a hook 22, slidably engaging under the projection 16 on one leg of the channel member 12. The other edge portion of the plate member 19 is downwardly and inwardly turned in a cylindrical manner, as indicated at 23, to a point indicated at 24 to provide a portion of substantially semi-cylindrical shape.

As best shown by Figs. 2, 4 and 6, portions of the plate member 19 at longitudinally spaced points, are cut out and turned downwardly and outwardly to provide semi-cylindrical elements indicated at 26, and these elements are substantially complementary to the downwardly and inwardly turned edge portion 23 and in conjunction therewith provide a cylindrical or tubular guide extending longitudinally of the plate member.

The diameter of the guide thus formed is substantially equal to the width of the channel portion 17 so that when the parts are related as shown by Fig. 4, with the plate member resting on the rollers, and the hook 22 engaging the underside of the projection 16, the guide has substantial line contact as indicated at 27 and 28, with opposite sides of the channel portion 17.

For adjusting the seat, a rod 30 is disposed longitudinally in the guide and projects outwardly beyond the front end of the seat where it is provided with a handle 31 for manipulating purposes. Intermediate its ends, the rod is provided with a helical spring 32, having one end 33 disposed radially in an opening in the rod, and its other end first extending axially as indicated at 34, and then in a circular manner as indicated at 35. The circular portion 35 at the end of the spring, is disposed in an annularly extending slot 36 in the plate member at the upper side of the guide and the free end thereof abuts an end wall of such slot. The helical part of the spring, is received in an elongated slot 38 in the plate member and it will also be observed that the lower and straight portion 34 of the spring end extends along the lower edge 24 of the downwardly and inwardly turned portion 23 of the plate member, it being understood that none of the elements 26 are located at this point to interfere with this disposition of the spring end.

It will be understood from this construction, referring particularly to Fig. 7, that if the rod 30 is turned in the direction indicated by the arrow, the spring will be wound so as to normally urge the rod back to its original position.

As best shown by Fig. 6, the rear end of the rod 30 has a radial projection 40 which is adapted to cooperate with one of a plurality of slots 41 formed in and spaced longitudinally of the free edge portion of the channel 17 and which have beveled side walls at the slot entry to facilitate movement of the projection thereinto. At this point also, the downwardly and inwardly turned portion 23 of the plate member 19 is provided with a narrow slot 42 which will permit such movement of the rod and projection 40 and movement of the projection to clear the extreme edge of the channel portion 17. This slot also locks the rod and plate member 19 for longitudinal movement as a unit.

Now, assuming that the seat is in its rearmost position, with the projection 40 on the rod 30, disposed in the rearmost slot 41, and it is desired to move the seat forwardly, it is only necessary to grasp the handle 31 and turn the rod counterclockwise as seen in Fig. 6, until the projection 40 is free of the slot 41. This turning of the rod, of course, will wind the spring. Then by pulling on the rod by means of the handle 31, in a forward direction, it and the plate member 19 supporting the seat, may be moved forwardly over the rollers 13, and when the seat is in the desired position the handle 31 may be released and the spring will return the rod to its normal position and cause the projection 40 to move into a corresponding slot 41, assuming, of course, that the seat has been moved forwardly to a point where the projection 40 is aligned with one of the slots. Engagement of the projection 40 in one of the slots 41, of course, will lock the seat in its adjusted position. The rod and plate member may be assembled before the elements 26 are turned downwardly as the guide then is open at one side, and with the guide open to this extent, the rod and projection 40 may be inserted and the latter through the slot 42. The spring may be mounted on the rod at first and inserted with the rod into the guide by simultaneously locating the spring in the recess 38 in the plate member with its end portion 35 in the slot 36. Then the elements 26 may be turned downwardly to complete the guide thus locking the rod therein. After the plate member and rod have been assembled, the former may be hooked first under the projection 16 on the lower channel member 12 and then turned more or less about this projection as a fulcrum, downwardly until the guide moves into the channel portion 17 and the plate member comes to rest on the rollers 13. The rollers 13 are free to roll in the channel 12 and it follows that a linear movement of the seat and member 19 will only cause the rollers to move through a distance along the channel, approximately half the distance the seat moves. For the purpose of holding the rollers within definite portions of the channel, lips 44 and 45 may be struck up from the base of the channel, a pair of such lips being illustrated with respect to each roller. Ordinarily, movement of the seat from one extreme position to the other, will only cause a movement of the rollers from one lip to the other. Use of rollers of this character is desirable in that lubrication of any journals or bearings may be avoided.

The arrangement may be sold as an article of manufacture to automobile manufacturers, and the channel member 12 may first be secured to the floor of the automobile and then the plate member 19 associated therewith in the manner just described. Then the seat may be disposed on the plate member and fastened thereto by means of the bolts 21. During adjusting movement of the seat, it will be appreciated that the guide has substantially line contact at points 27 and 28 with the channel and that it will maintain the lateral position of the seat without much frictional resistance during movement thereof. It will also be apparent that the hook portion 22 will lock the seat against upward movement so that the seat will be positively maintained in position on the rollers.

The arrangement provided is extremely efficient for controlling the position of a seat in an automobile or the like and because of its construction, may be manufactured inexpensively and particularly from sheet metal. It will be appreciated that the seat will be positively guided and retained on the floor, and that a smoothly operating mechanism functioning substantially free of any great degree of friction has been provided.

Although only one form of the invention has been illustrated and described in detail, it will be apparent to those skilled in the art that various modifications may be made without departing from the scope of the appended claims.

I claim:

1. The combination with a seat element and a supporting element, of a pair of plate members secured to the elements respectively, roller elements between the members for supporting one on the other and having rolling contact with both members, one of said members having a portion bent to form a guideway at one side of the rollers, and means in the guideway and cooperating with both members for retaining them in adjustable positions.

2. The combination with a seat element and supporting element therefor, of a channel member secured to one of the elements, one leg of the channel member being bent to form a second channel adjacent the first channel, a roller in the first channel, a plate member secured to the other element and movably resting on the roller, and means in the second channel and cooperating with the plate member for adjusting the plate member longitudinally of the channel member.

3. The combination with a seat element and supporting element therefor, of a channel member secured to one of the elements, one leg of the channel member being bent to form a second channel adjacent the first channel, a roller in the first channel, a plate member secured to the other element and movably resting on the roller, the plate member having a substantially cylindrical portion disposed in the second channel, and adjusting means mounted in the cylindrical portion and adapted to cooperate with said second channel for adjusting the one member relative to the other longitudinally of the channel member.

4. An article of manufacture comprising elongated plate members, attaching portions formed on the plate members for securing them to a seat and support respectively, one of the plates having laterally spaced and longitudinally extending guideways therein, roller bearing means in one of the guideways for movably supporting one plate on the other, and means extending longitudinally in the other guideway and cooperating with both plates for locking the plates in relatively adjusted positions.

5. An article of manufacture comprising elongated plate members, attaching portions formed on the plate members for securing them to a seat and support respectively, one of the plates having laterally spaced and longitudinally extending guideways therein, roller bearing means in one of the guideways for movably supporting one plate on the other, and means extending longitudinally in the other guideway and cooperating with the plates for relatively moving the latter and locking them in relatively adjusted positions.

6. An article of manufacture comprising elongated plates adapted to be secured to a seat and support respectively, bearing means for movably supporting one plate on the other, one of said plates having a longitudinally extending, cylindrically bent portion, a rod journaled in and by the walls of said cylindrically bent portion, means securing the rod against longitudinal movement in the cylindrical portion, and means on the rod and cooperating with the other plate for securing the plates in relatively adjusted positions.

7. An article of manufacture comprising elongated plates adapted to be secured to a seat and support respectively, bearing means for movably supporting one plate on the other, one of said plates having a longitudinally extending, cylindrically bent portion, a rod journaled in and by the walls of said cylindrically bent portion, means securing the rod against longitudinal movement in said cylindrically bent portion, means on the rod and cooperating with the other plate for securing the plates in relatively adjusted positions, and means on the other plate and cooperating with the cylindrically bent portion for normally preventing relative lateral movement of the plates.

8. An article of manufacture comprising elongated plates adapted to be secured to a seat and support respectively, bearing means for movably supporting one plate on the other, a longitudinally extending rod journaled on one lateral edge portion of one plate, means securing the rod against longitudinal movement relative to the latter plate, a radial projection on the rod, and notches in a free edge of the other plate and adapted to selectively cooperate with the radial projection to hold the plates in relatively adjusted positions.

9. An article of manufacture comprising elongated plates adapted to be secured to a seat and support respectively, bearing means for movably supporting one plate on the other, one of said plates at one lateral edge having portions bent to form a cylindrically shaped guideway extending longitudinally of the plate, a longitudinally extending rod journaled in said cylindrically formed portion, means securing the rod against longitudinal movement relative to said cylindrically formed portion, a radial projection on the rod, and notches in a free edge of the other plate and adapted to selectively cooperate with the radial projection to hold the plates in relatively adjusted positions.

10. An article of manufacture comprising elongated plates, means for fastening such plates to a seat and support respectively, means on the plates forming laterally spaced guideways between the plates, roller bearings in one guideway and movably supporting one plate on the other, a rod rotatable in the other guideway and extending longitudinally thereof, means locking the rod to one plate to prevent longitudinal movement thereof with respect to such plate, and means on the rod and other plate for adjustably locking the plate in different and relative longitudinal positions.

11. An article of manufacture comprising elongated plates, means for fastening such plates to a seat and support respectively, means on the plates forming laterally spaced guideways between the plates, roller bearings in one guideway and movably supporting one plate on the other, a rod in the other guideway and extending longitudinally thereof, means on one plate rotatably supporting the rod in such guideway, and means on the rod and the other plate for locking the plates in adjustable position, the parts being so arranged that the plates can be readily assembled and separated by bodily movement of one plate with respect to the other.

12. An article of manufacture comprising elongated plates, means on the plates forming laterally spaced and longitudinally extending guideways between the plates, rollers in one of the guideways and movably supporting one plate on the other, a rod rotatable in the other guideway, means connecting the rod to one plate in such manner as to prevent longitudinal movement of the rod with respect to such plate, and means on the rod and adapted to cooperate with notches formed in the free edge of the other plate adjacent the last mentioned guideway, for adjustably locking the plates in different positions.

13. An article of manufacture comprising elongated plate members, attaching portions formed on the plate members for securing them to a seat and support respectively, means on the plate members forming laterally spaced and longitudinally extending guideways between the plates, roller bearing means in one of the guideways for movably supporting one plate on the other, and means extending longitudinally in the other guideway and cooperating with both plates for locking the latter in relatively adjusted positions.

14. The combination with a seat element and a supporting element, of a pair of elongated plate members secured to the elements respectively, roller elements between the members for supporting one on the other, one of said members having a portion bent to form a longitudinally directed guideway laterally spaced from the rollers, and means for locking the plate members in relatively adjusted positions longitudinally thereof and including a movable member extending longitudinally in the guideway.

ALBERT T. POTTER.